US005386462A

United States Patent [19]

Schlamp

[11] Patent Number: 5,386,462

[45] Date of Patent: Jan. 31, 1995

[54] VENDING SYSTEM WITH A GIVEN NUMBER OF COMPARTMENTS

[75] Inventor: Hans Schlamp, Munich, Germany

[73] Assignee: Accumulata Verwaltungssgesellschaft mbH, Germany

[21] Appl. No.: 240,389

[22] Filed: May 10, 1994

Related U.S. Application Data

[63] Continuation of Ser. No. 956,855, Oct. 2, 1992, abandoned.

[30] Foreign Application Priority Data

| | | | |
|---|---|---|---|
| Oct. 2, 1991 | [DE] | Germany | 4132856 |
| Oct. 17, 1991 | [DE] | Germany | 4134410 |

[51] Int. Cl.[6] .................... H04M 11/00; G06F 15/20; H04N 7/14

[52] U.S. Cl. .................... 379/106; 379/91; 379/93; 379/96; 379/97; 364/479; 348/13

[58] Field of Search .................... 379/106, 93, 91, 95, 379/96, 97, 98; 364/401, 479; 348/13, 14

[56] References Cited

U.S. PATENT DOCUMENTS

| | | | |
|---|---|---|---|
| B1 4,231,105 | 1/1986 | Schuller et al. | 364/900 |
| 4,231,105 | 10/1980 | Schuller et al. | 364/900 |
| 4,845,636 | 7/1989 | Walker | 379/91 |
| 4,894,717 | 1/1990 | Komei | 358/85 |
| 4,905,094 | 2/1990 | Pocock et al. | 364/401 |
| 5,097,981 | 3/1992 | Degasperi et al. | 221/3 |

FOREIGN PATENT DOCUMENTS

| | | |
|---|---|---|
| 2636456 | 3/1990 | France . |
| 3726936C2 | 12/1989 | Germany . |
| 3726936 | 12/1989 | Germany . |
| 9012576 | 2/1990 | Germany . |
| 3914686A1 | 9/1991 | Germany . |
| 2150728 | 7/1985 | United Kingdom . |

*Primary Examiner*—Curtis Kuntz
*Assistant Examiner*—Jason Chan
*Attorney, Agent, or Firm*—Morgan & Finnegan

[57] ABSTRACT

The invention pertains to a vending system in which a compartment unit (1) with a given number of compartments (2) each of which is provided with a door (4) that can be locked by a locking device is assembled in a room (6) together with a computing unit (3). A presentation device (40) is assigned to the computing unit (3), whereby the presentation unit comprises at least one memory device (42, 49) in which text and/or visual information about the goods offered in designated compartments (2) are stored. The compartment number of the compartment (2) containing the corresponding goods as well as the price of these goods can be assigned to the text and/or visual information. The presentation device (40) can receive information to reserve a compartment (2), the offer number assigned to certain text and/or visual information and information pertaining to the identification of the customer by an input device (43, 47).

17 Claims, 1 Drawing Sheet

VENDING SYSTEM WITH A GIVEN NUMBER OF COMPARTMENTS

This is a continuation of co-pending application Ser. No. 07/956,855, filed on Oct. 2, 1992, now abandoned.

BACKGROUND OF THE INVENTION

1. Field of the Invention

The invention pertains to a vending system with a given number of compartments.

2. Description of the Related Art

The German Patent No. DE 39 14 686.3 (Offenlegungschrift) introduced a vending system with a given number of compartments of this type in which the merchant code of at least one merchant and a given number of account numbers and possibly even customer numbers of certain customers are stored in a memory. In order to reserve a compartment, a merchant enters an identifying merchant code into an input device, and the computing unit of the system reserves a suitable compartment after a customer number assigned to a certain customer has been entered. The merchant enters the price of the goods to be placed into the assigned compartment into the memory with the computing unit. The computing unit displays a suitable compartment for the goods on a display device and unlocks the door of this compartment. After the goods have been placed into the displayed compartment, the computing unit relocks the door.

In order to collect the goods, the customer gains access by entering his identifying account number and possibly his customer number. The computing unit displays the compartment reserved for the customer on a display device and unlocks the door of the compartment. The computing unit subsequently effects that the door of the displayed compartment is locked after the goods have been removed.

One problem of this known vending system can be seen in that compartments that are not yet occupied at the time at which the store closes cannot be utilized for vending purposes.

SUMMARY OF THE INVENTION

The invention is thus based on the objective to modify a vending system of the aforementioned type such that the efficiency of the compartments and the economy of the system is improved.

This objective is attained by a vending system of the aforementioned type constructed according to present invention.

The essential advantage of the vending system according to the invention can be seen in that a merchant can place goods into compartments not yet reserved in the evening at the time at which the store closes, and that a customer is able to make a selection from these goods after the store is closed. The system also provides for the fact that the customer is notified about the available goods either at the access door to the vending machine by a loud speaker or a monitor, or he can obtain this information by the telephone network either vocally or visually without requiring sales personnel. The customer can advantageously select from the array of goods relayed to him in the aforementioned manner and subsequently obtain the number of the compartment that contains the goods selected by him after entering the room in which the compartments are arranged, as is the case with the known vending system. Since it is possible for the customer to reserve a compartment with this particular system, it is ensured that the offered goods will be present at the time of collection. Therefore, the customer is not limited to select from the array of goods available in the vending machine at the time of collection as is the case with conventional vending machines.

One further advantage of the invention can be seen in that the compartments of the known vending system are utilized much better than with conventional systems, which means that the vending system amortizes itself much better. An improved energy efficiency results from the fact that compartments cooled independently which goods are stored within can be occupied much more frequently. The vending system according to the invention makes it possible to utilize the compartments by 100%.

In one particularly preferred example of the invention, an electronic digital voice memory for the storage of information pertaining to the goods placed into the compartments is provided, whereby the merchant introducing the goods assigns the text stored in the voice memory to the number identifying the compartments containing the corresponding goods. By dialing a special telephone number, the customer can access the voice memory with the public telephone network and obtain detailed information about the price and the type of goods offered in the compartments from the voice memory. By entering a, for example, two-digit number into the keyboard of the telephone, the customer can select certain goods from the array of goods offered and reserve the compartment containing the desired goods for collection at a later time.

The customer preferably enters his customer number and a few, for example, the last two digits of his account number for identification purposes with the telephone. Visual information and/or advertising spots about the array of goods stored in the additional compartments can be transmitted from an image memory to the caller with the established telephone connection.

It is particularly preferred to provide the customer with information about the goods stored in the additional compartments with a loud speaker or a monitor at the access door to the room in which the compartments are arranged. It is, for example, also possible to provide the customer with information in the form of visual information and/or advertising spots. In one preferred example of the invention, the vending system is expanded by a coin or money testing device, so that a circle of customers not participating in the vending system can be included. It is thus possible that customers not registered in the system can perform cash purchases.

Further advantageous developments of the invention are outlined in the subclaims.

DESCRIPTION OF THE PREFERRED EMBODIMENTS

Figure 1:
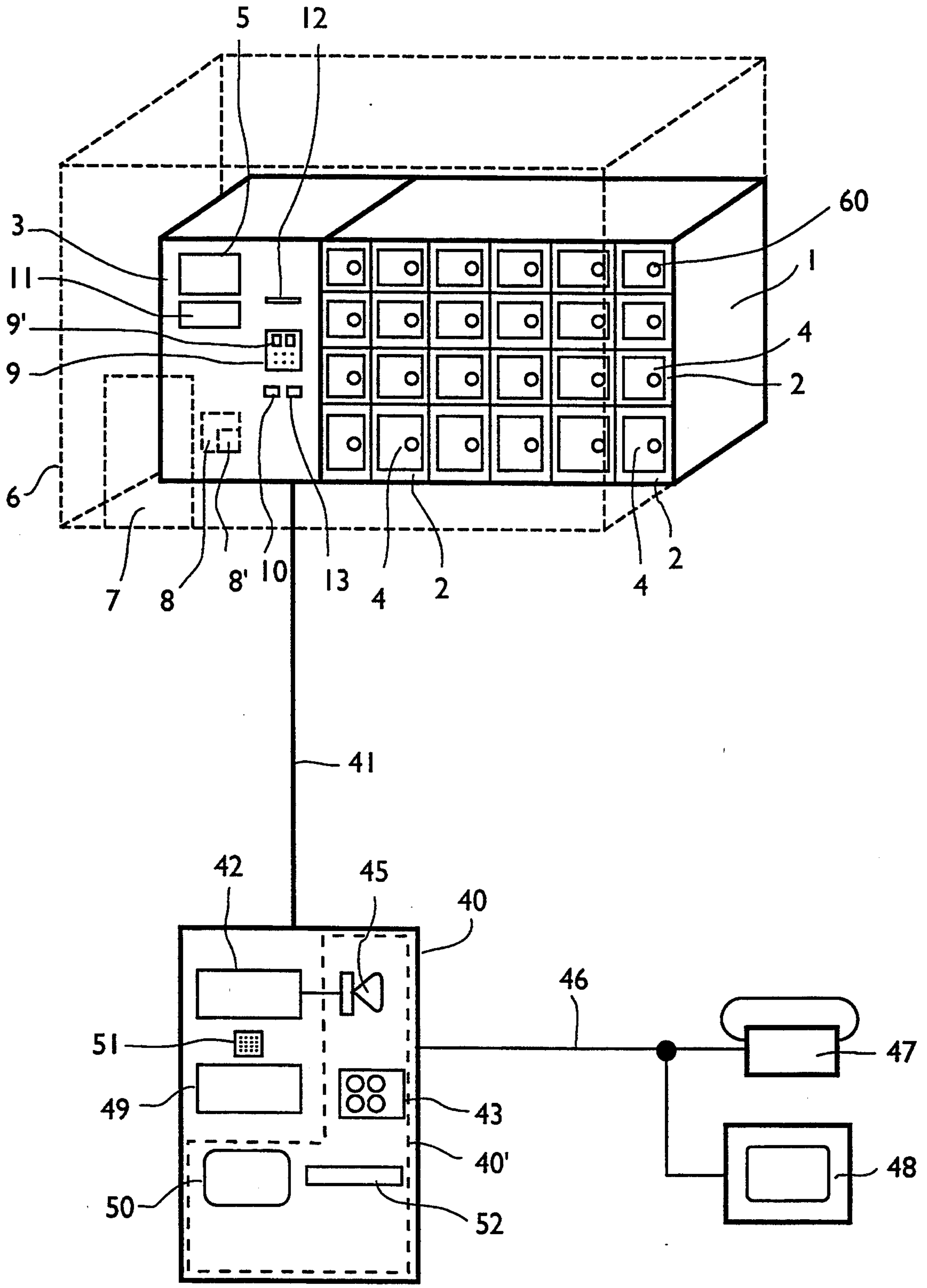
FIG. 1 is a diagram of the vending system of the present invention.

The invention in its further developments are in the following described in detail with the aid of FIG. 1.

According to this figure, the vending system comprises a compartment unit (1) with compartments (2) and a computing unit (3). Each compartment (2) has a door (4) which can preferably be locked electromagnetically by a locking device (60). The computing unit (3) comprises at least one display device (5) such as a monitor, a memory (11) and an input device (12) as well as a keyboard (9).

The compartment unit (1) and the computing unit (3) are located in a room (6) which is illustrated in the figure by broken lines and has an access door (7) that is also illustrated in broken lines. A terminal (8) by means of which a customer number assigned to a certain customer, for example a four-digit number, can be entered by a keyboard (8') which is located next to the access door (7), in order to open the access door (7). The circle of persons having access to the room (6) can be limited in this manner.

The room is preferably arranged in a building in which several different stores such as a butchery, a bakery, a delicatessen and a drugstore are located which distribute their goods with the compartments (2) during the times at which the stores are closed.

The distribution of the goods with the compartments (2) is executed in the following manner. During conventional business hours a customer orders the desired goods after mentioning his name and his customer number, all of which represent his identification for the purchase of the goods.

After the order has been received, the merchant compiles the ordered goods and transports them into the room (6). By activating the key (9') on a keyboard (9) on the computing unit (3), the merchant enters different information into the memory (11) of the computing unit (3). This information pertains to the customer number, the price of the goods placed in the compartment (2) and information identifying the store or merchant (merchant code). Based on the information stored in the memory (11), the computer of the computing unit (3) determines the complete account number from the preferably four-digit customer number. The computing unit (3) then indicates a suitable empty compartment (2) from the multitude of compartments (2) if no compartment (2) has yet been reserved for the corresponding customer or the customer number assigned to the same. This compartment (2) is displayed to the merchant on the monitor (5). The computing unit (3) then delivers an unlocking signal to the electromagnetic locking mechanism of the displayed compartment (2), so that the door (4) of the compartment (2) can be opened.

In order to be able to execute the aforementioned procedure, the computing unit (3) is provided with the aforementioned memory (11). Up to 10,000 or more customer numbers, as well as the corresponding account numbers and addresses or other relevant data of the person authorized for the purchase, can be stored in this memory (11). This information is entered into the memory (11) once the customer has decided to participate in the system.

In order to collect the goods assembled in one or more compartments (2), the customer at first gains access to the room (6) in the aforementioned manner by entering his customer number into the keyboard (8') of the terminal (8). The customer now inserts his debit card or credit card into the slot of the input device (12) at the computing unit (3). After the account number of the customer was entered into the computing unit (3) or the memory (11) in this manner, the monitor (5) displays in which compartment (2) or in which compartments (2) the goods are located. The amount to be paid is simultaneously displayed, and the corresponding compartment (2) is unlocked, so that the customer can collect the goods assembled for him. The amount to be paid and the account number of the customer and information identifying the merchant (merchant code) is now stored in the memory (11). The thus far described vending system is known.

In order to increase the efficiency of the compartments in this known system, the invention provides the possibility that compartments (2) not yet occupied at the time at which the store closes can be loaded with a given array of goods offered by the stores participating in the vending system. In particular, it is intended that these compartments which are, in the following, referred to as "additional compartments (2)" are loaded with such goods from the regular assortment which are most frequently desired or purchased in the evening or during the night. These goods primarily concern food articles such as cheese plates, sausage plates and similar ready-to-eat dishes.

In order to make it possible for a customer to select from the array offered in the additional compartments (2), the computing unit (3) is preferably provided with a presentation device (40), whereby this presentation device (40) comprises a voice memory, preferably a digital memory (42) in which the voice text for each of the goods offered in the additional compartments (2) is stored. This voice text comprises a description of the goods as well as their price. The presentation device (40) can advantageously be provided with a microphone (51) by means of which the voice text can be entered into the voice memory (42). The presentation device (40) is furthermore provided with an input device, preferably in the form of a keyboard, by means of which the merchant can enter the compartment numbers at the time at which he places the goods into the additional compartments to assign the voice text stored in the voice memory (42) or the text number assigned to the same to the corresponding additional compartments (2). In order to simplify this process, a short overview of the voice text in the memory (11) can be stored in the computing unit (3) and retrieved on a monitor, preferably the monitor (5) of the computing unit (3) in addition to the collection of text stored in the voice memory. The merchant can retrieve this short overview in order to assign the voice text to the corresponding compartments (2). The assignment is preferably executed by the keyboard (9) of the computing unit (3). It can also be altered by means of this computing unit. Preferably, the input device is the keyboard (9) of the computing unit (3).

As previously mentioned, the price is a component of the corresponding voice text which can be recorded anew with the microphone (51) or selected from a corresponding list of text displayed on the monitor (5) of the computing unit (3).

In a particularly preferred example, the presentation device (40) can be accessed by the public telephone network (46) by telephones (47) of the customers participating in the vending system, so that the text information of the voice memory (42) can be replayed through the telephone network (46), for example, similar to a telephone answering device. In this particular instance it is also possible to utilize a magnetic tape containing the corresponding information instead of the voice memory, whereby the magnetic tape is also controlled by the computing unit (3).

The advantage of the digital voice memory can be seen in that the computing unit (3) can control the corresponding text and thus adapt to the continuously depleting stock of goods offered for sale. In other words, goods no longer present in the compartments are not offered for sale.

The customer can select the desired goods by pressing the numbers of the telephone (47) and entering the offer number previously transmitted to him by the voice text pertaining to the goods offered in the additional compartments (2), and reserve these goods for collection. The offer number is preferably a two-digit number.

In order to identify himself, the customer can also enter a few, for example the last two digits of his account number with the telephone (47) in addition to the offer number and his customer number to prevent misuse of the vending system, so that the computing unit (3) can determine if a serious order exists or not by comparing the information transmitted from the presentation device (40) with the account and customer numbers stored in the memory (11). A reservation for the corresponding goods for later collection is only executed if concurrence exists, and the reservation can be confirmed by notification by the voice memory (42).

In order to provide the customer with a comprehensive idea about the offered goods, the presentation device (40) can also comprise an image memory (49). Visual information and/or advertising spots pertaining to the offered goods can be transmitted from this image memory in addition to or instead of the text transmitted. Preferably, this visual information or advertising spot also includes the price of the goods. An assignment of the visual information and/or advertising spot to the corresponding occupied additional compartment (2) by the merchant is executed in the initially described manner with the input device (9) or by activation of touch-sensitive areas of a monitor (5) constructed as a touch-screen. In addition to the visual information and/or the advertising spots stored in the image memory (49), a short overview pertaining to the visual information and/or advertising spots in the memory (11) of the computing unit (3) can be displayed on the monitor (5) of the computing unit (3). The merchant can retrieve this short overview on the monitor (5) in order to assign the visual information and/or advertising spots to the corresponding compartments. The short overview can be entered or altered with the keyboard (9) of the computing unit (3).

Using the telephone line (46), the visual information and/or advertising spots contained in the image memory (49) of the presentation device (40) can be transmitted by the telephone line (46) to the location of the customer's telephone (47). A monitor or data display device (48) can be assigned to the telephone (47) of the customer for this purpose, whereby the monitor or data display device receives the information in digital form by the telephone (46) from the previously described image memory (49) of the presentation device.

The aforementioned process is in particular suitable for digital transmission by a digital telephone network (as for example, ISDN=Integrated Services Digital Network). This process makes it possible to transmit visual information recorded with a video camera.

However, it is also possible to construct the telephone (47) and the data display device (48) as components of a BTX-terminal. In this particular instance, the customer receives the visual information and the text from the BTX-computer of the post office on the monitor of the BTX-terminal and enters the corresponding information (see above) pertaining to the reservation of goods into the keyboard of the BTX-terminal. This information is retrieved from the BTX-computer of the post office and relayed to the computing unit (3) in a polling process. The visual information and the text are entered into the BTX-computer of the post office by a BTX-terminal. Information and corresponding orders pertaining to a constantly depleting array of goods are transmitted from the computing unit (3) to the BTX-computer of the post office. In other words, the additional BTX-array of goods that can be retrieved by the customer can be adapted to the array of goods that is offered for sale and constantly depleted.

The data transmission between the telephone (47) and the presentation device (40) can also be executed according to the impulse selection process or according to the multifrequency process which is particularly safe against interferences. With digital telephone networks such as ISDN, the transmission is also executed in direct and digital form.

It would also be possible to arrange a part (40') of the presentation device (40) with or without a connection to the public telephone network (46) in the area of the access door (7) to the room (6) containing the compartment unit (1) such that a customer can listen to the voice text from the voice memory (42) through a loud speaker (45) of the part (40') after actuation of the keys on the input device (43) of the part (40'). In this particular instance, the visual information and/or advertising spots stored in the image memory (49) can be displayed to the customer on the monitor (50) of the part (40'). The customer enters the offer number previously transmitted to him together with the voice text and/or visual information or advertising spots concerning the goods offered in the additional compartments (2) by the loud speaker (45) and/or the monitor (50), and the identification of the customers is executed in the previously described manner by entering the offer number, the customer number and at least one digit of the account number into the keyboard (43) of the part (40') of the presentation device (40).

The collection of the goods with a reservation by telephone or BTX-reservation of a compartment, as well as with a direct selection at the part (40') of the presentation device (40), is executed in the manner described above in connection with the known vending system. At the time of collection, the customer number is entered into the keyboard (8') in order to open the access door (7), and the customer number and the account number is entered into the computing unit (3) by insertion of a debit card or a credit card to open the displayed compartment (2).

In order to make it possible that customers not participating in the system can perform cash purchases, the part (40') of the presentation device (40) assembled in the area of the access door (7) can comprise a coin and/or money testing device (52), whereby the access door (7) and the corresponding compartment (2) are only opened after the cash amount displayed for the selected goods was inserted.

I claim:

1. A vending system located in a room, comprising:
a compartment unit including
compartments, each of the compartments having a locking device and a door that can be locked by the locking device and storing goods to be purchased, and each of the compartments assigned an offer number and a price for the goods contained therein; and a computing unit connected to the locking device of each of the compartments, and assigning the offer number and the price to each of the compartments containing the goods using at least one of text and visual information; and a presentation unit connected to the computing unit, the presentation unit including at least one memory device connected to the computing unit and storing the at least one of text and visual information about the goods stored in the compartments;

communication means for communicating the offer number and the price to a customer assigned by the computing unit; and an input device connected to the at least one memory device, and receiving from the customer reservation information to reserve one of the compartments, the reservation information including the offer number and identification information to identify the customer, wherein the computing unit receives the reservation information from the presentation unit and updates the at least one of text and visual information stored in the at least one memory device preventing previously purchased goods from being offered for sale to the customer.

2. The system according to claim 1, wherein the at least one memory device has a voice memory in which the text information pertaining to the goods offered in the compartments can be stored.

3. The system according to claim 2, wherein the voice memory is a digital voice memory.

4. The system according to claim 1, wherein the at least one memory device has an image memory in which the visual information pertaining to the goods offered in the compartments can be stored.

5. The system according to claim 2, wherein the presentation unit has a microphone which a merchant uses to enter text information into the voice memory.

6. The system according to claim 1, wherein the presentation unit can be accessed by a public telephone network by telephones of customers participating in the vending system, the at least one of text and visual information stored in the at least one memory device is transmitted to the telephones through the public telephone network, and a selection of certain goods and the reservation information for reserving one of the compartments containing the certain goods is executed by entering the offer number using a telephone as the input device.

7. The system according to claim 6, wherein the customer enters a customer number in addition to the offer number using a number pad of the telephone in order to identify the customer to the vending system.

8. The system according to claim 7, wherein the customer enters digits indicating an account number and the customer number for security reasons which are transmitted to the vending system, and the computing unit compares the customer number and the account number stored in a second memory with stored information entered before the one of the compartments is reserved.

9. The system according to claim 6, wherein transmission of the information entered using the telephone by the public telephone network is executed according to a multifrequency process.

10. Vending system according to claim 6, wherein transmission of the information entered using the telephone through the public telephone network is executed according to an impulse selection process.

11. The system according to claim 6, wherein the at least one memory device includes an image memory, and a data display device is connected to the telephone, and the information transmitted from the image memory by the public telephone network is displayed on the data display device.

12. The system according to claim 11, wherein the telephone and the data display device are components of a terminal, and the offer number is entered into the terminal.

13. The system according to claim 2, wherein a part of the presentation unit is arranged outside of the room accessible to the customer and provided with a loud speaker used to announce the text information stored in the voice memory.

14. The system according to claim 13, wherein the part of the presentation unit comprises a monitor on which visual information stored in an image memory of the at least one memory device is displayed.

15. The system according to claim 1, wherein a presentation input device is connected to the presentation unit and a merchant enters the offer number and the price while placing the goods into the compartments in order to assign the one of text and visual information stored in the at least one memory device to the compartments having the goods contained therein.

16. The system, according to claim 15, wherein the presentation input device includes one of a keyboard and a touch-sensitive screen.

17. The system according to claim 13, wherein the part of the presentation device includes one of a coin and money testing device for displaying prices and receiving payment for the goods, so that the customer can enter the offer number of the goods at the input device after receiving the one of text and visual information stored in the at least one memory device and insert the payment corresponding to one of the prices into the one of coin and money testing device, and an access door of the room and the door of one of the compartment assigned to the offer number are opened after the payment has been inserted by the customer.

* * * * *